(12) United States Patent
Sakuma

(10) Patent No.: US 8,077,077 B2
(45) Date of Patent: Dec. 13, 2011

(54) RECOGNITION SYSTEM FOR VEHICLE

(75) Inventor: Yasushi Sakuma, Chita-gun (JP)

(73) Assignee: Denso Corporation, Kariya (JP)

( * ) Notice: Subject to any disclaimer, the term of this patent is extended or adjusted under 35 U.S.C. 154(b) by 261 days.

(21) Appl. No.: 12/381,935

(22) Filed: Mar. 18, 2009

(65) Prior Publication Data

US 2009/0237291 A1    Sep. 24, 2009

(30) Foreign Application Priority Data

Mar. 21, 2008 (JP) ................................. 2008-074042

(51) Int. Cl.
*G01S 13/06* (2006.01)
*G01S 13/93* (2006.01)

(52) U.S. Cl. .......................................... 342/70; 701/300
(58) Field of Classification Search ...................... 342/70
See application file for complete search history.

(56) References Cited

U.S. PATENT DOCUMENTS

| 6,085,151 | A  | * | 7/2000 | Farmer et al. ................. 701/301 |
| 6,420,996 | B1 | * | 7/2002 | Stopczynski et al. ........... 342/70 |
| 6,882,923 | B2 | * | 4/2005 | Miller et al. ..................... 701/96 |
| 6,888,622 | B2 | * | 5/2005 | Shimomura .................. 356/4.01 |
| 6,944,543 | B2 | * | 9/2005 | Prakah-Asante et al. ..... 701/301 |
| 7,486,199 | B2 | * | 2/2009 | Tengler et al. ................. 340/902 |
| 7,523,000 | B2 | * | 4/2009 | Tengler et al. ................. 701/301 |
| 7,554,485 | B2 | * | 6/2009 | Jordan ............................. 342/90 |
| 2003/0102997 | A1 | * | 6/2003 | Levin et al. ..................... 342/57 |
| 2005/0225457 | A1 |   | 10/2005 | Kagawa |
| 2009/0040095 | A1 |   | 2/2009 | Ogawa |
| 2009/0237293 | A1 |   | 9/2009 | Sakuma |

FOREIGN PATENT DOCUMENTS

| JP | 2002-099986 | 4/2002 |
| JP | 2005-050187 | 2/2005 |
| JP | 2005-301581 | 10/2005 |
| JP | 2006-318093 | 11/2006 |
| JP | 2007-280060 | 10/2007 |

OTHER PUBLICATIONS

Notice of Rejection dated Apr. 27, 2010 in Japanese Application No. 2008-74042 with English translation thereof.

* cited by examiner

*Primary Examiner* — Thomas Tarcza
*Assistant Examiner* — Matthew M Barker
(74) *Attorney, Agent, or Firm* — Harness, Dickey & Pierce, PLC

(57) ABSTRACT

In a recognition system for a vehicle, forward vehicle information and infrastructural information are checked together and with respect to information that can be considered to pertain to one and the same vehicle. Pieces of information on position and speed are averaged to acquire the information of the vehicle. Pieces of information that can be considered to pertain to one and the same vehicle are searched for and integrated into one. Further, estimated values of speed and position in the future are corrected using traveling information and outputted to a drive assisting device.

7 Claims, 9 Drawing Sheets

INFRASTRUCTURAL INFORMATION

| ID | VEHICLE ID | 12345 |
| --- | --- | --- |
| | LENGTH × WIDTH | D × E |
| GPS | LATITUDE/LONGITUDE | F/G |
| | DIRECTION | H |
| | TIME | J:K:L |
| TRAVEL | SPEED | Mkm/h |
| | TURN | LEFT / RIGHT / HAZARD / (OFF) |
| | BRAKE | ON / (OFF) |
| | BRAKE | ON / (OFF) |
| | BRAKE | ON / (OFF) |

RECOGNITION SYSTEM FOR VEHICLE

CROSS REFERENCE TO RELATED APPLICATION

This application is based on and incorporates herein by reference Japanese Patent Application No. 2008-74042 filed on Mar. 21, 2008.

FIELD OF THE INVENTION

The present invention relates to a system that recognizes objects.

BACKGROUND OF THE INVENTION

A conventional recognition system for a vehicle uses a radio detection and ranging device (radar), which recognizes the position of the other vehicle traveling a little away from a subject vehicle thereby to recognize the surrounding condition of the subject vehicle. Such a radar device is located on a straight road to radiate periodically a millimeter wave as a radar wave toward a predetermined range (for example, JP 2002-99986 A). This radar device receives a radar wave reflected by the other vehicle, and recognizes the other vehicle based on the result of reception of the reflected radar wave. Thus it becomes possible to predict possibility of collision between vehicles and carry out necessary processes to avoid such a collision.

However, the conventional system necessarily takes some time to collect sufficient number of pieces of position information with high reliability after the vehicle successfully acquired (captured) the other vehicle. If the surround condition, for example, positions of surrounding vehicles, is recognized with only a small number of pieces of position information, the recognition will likely become erroneous.

This is because the system will continuously receive noises, that is, radar waves reflected by an object, which need not be acquired, when the position of an object is acquired by using radar wave. It is therefore necessary to eliminate the noises. One approach is to use the position information of an object and output it only after the same object has been acquired a plurality of times. According to this approach, however, the information of a vehicle cannot be recognized, when the vehicle has just entered a range of capture of radar from outside such a range and has not been acquired sufficient number of times.

SUMMARY OF THE INVENTION

It is therefore an object of the invention to provide a recognition system for a vehicle, which is capable of accurately recognizing the position of an object within a short time after acquiring the object by a radar wave.

According to one aspect of the present invention, a recognition system for a vehicle comprises a recognition device provided in a subject vehicle and a transmission device, which are provided in a subject vehicle. The recognition device includes an analyzing section, which is configured to determine position of an object by radiating a radar wave and receiving a reflected wave reflected by the object. The transmission device is configured to transmit wirelessly present position information of the subject vehicle into a surrounding area. The recognition device includes a receiving section, a position acquiring section, a recognizing section and a position correcting section.

The receiving section is configured to receive position information from an outside. The position acquiring section is configured to acquire the present position information of the recognition device. The recognizing section is configured to recognize as a nearby object an object presumed to be equipped with a communication device among objects whose positions have been determined by the analyzing section based on a result of analysis by the analyzing section, the position information received by the receiving section, and a result of acquisition by the position acquiring section. The position correcting section is configured to correct the position information of the nearby object based on the result of acquisition by the position acquiring section and the position information of the nearby object received by the receiving section.

BRIEF DESCRIPTION OF THE DRAWINGS

The above and other objects, features and advantage of the present invention will become more apparent from the following detailed description made with reference to the accompanying drawings. In the drawings.

DETAILED DESCRIPTION OF THE PREFERRED EMBODIMENT

Figure 1:
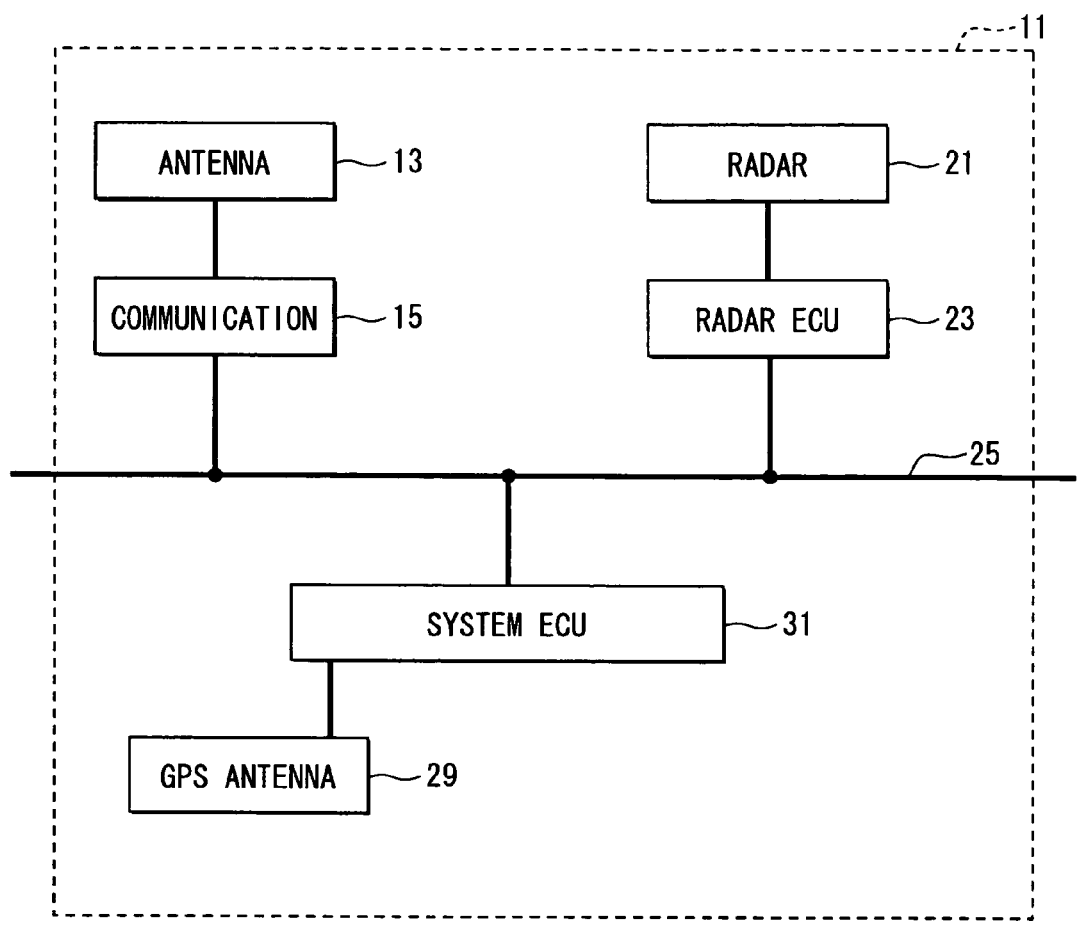
FIG. 1 is a block diagram illustrating an inter-vehicle communication device to which the invention is applied.

Referring first to FIG. 1, an inter-vehicle communication device 11 equipped and used in a vehicle includes a communication antenna 13, a communication control ECU 15, a radar device (radar) 21, a radar control ECU 23, a vehicle LAN 25, a GPS antenna 29 and a system control ECU 31.

The communication antenna 13 transmits and receives radio waves for communication with inter-vehicle communication devices 11 mounted on other vehicles and is controlled by the communication control ECU 15. From the communication antenna 13, radio waves with a range of a few tens of meters to a few hundreds of meters are outputted.

The communication control ECU 15 generates transmission signals based on data received through the vehicle LAN 25 and causes the communication antenna 13 to transmit the signals as radio waves. The communication control ECU 15 thereby transmits data to the inter-vehicle communication devices 11 equipped in other vehicles. Further, the communication control ECU 15 restores data to original state based on radio waves sent from the inter-vehicle communication device 11 equipped in another vehicle and received by the communication antenna 13 and outputs the data to the vehicle LAN 25.

Figure 2:
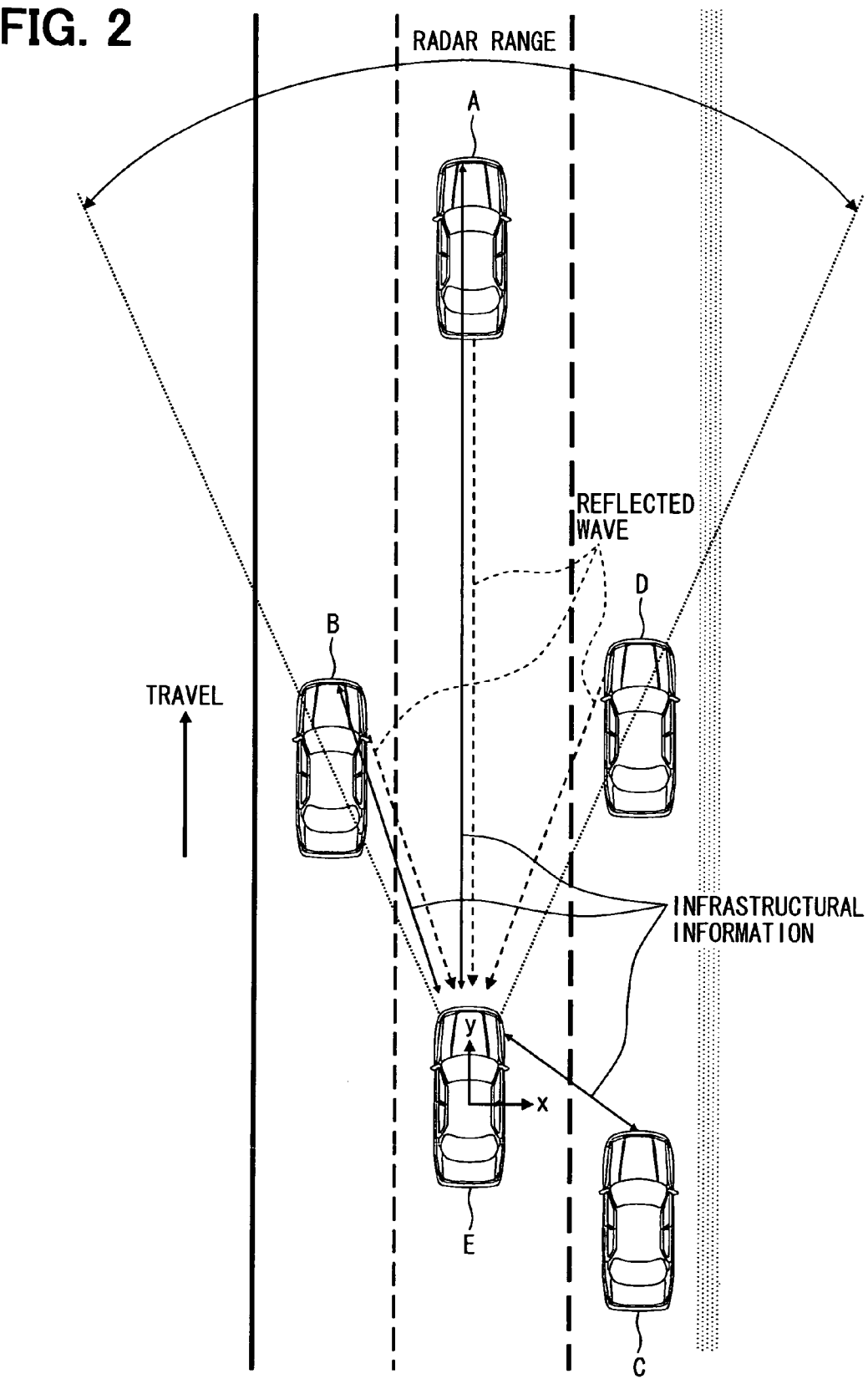
FIG. 2 is a schematic diagram illustrating communications among the inter-vehicle communication devices equipped in the vehicles.

The radar 21 outputs a millimeter wave in a forward area ahead of the subject vehicle equipped with the inter-vehicle communication device 11 and receives a reflected wave from an object present ahead of the vehicle (FIG. 2).

The radar control ECU 23 controls the radar 21 to define means for determining a position of an object by radiating a radar wave and receiving a reflected wave. In addition, the radar control ECU 23 measures the distance to the object present ahead of the vehicle based on the time it takes for the millimeter wave outputted by the radar 21 to come back as a reflected wave. The radar control ECU 23 outputs information on the result of the measurement to the vehicle LAN 25.

The GPS antenna 29 includes means for receiving position information that receives radio waves from GPS satellites and outputs received signals to the system control ECU 31.

The system control ECU 31 includes means for acquiring the present position that calculates the position of the subject vehicle from an output signal from the GPS antenna 29. In addition, the system control ECU 31 acquires various information through the vehicle LAN 25 and further outputs information for controlling the ECUs connected to the vehicle LAN 25.

In addition, the system control ECU 31 acquires infrastructural information (described in detail later) related to the subject vehicle and transmits the acquired infrastructural information to the surrounding area through the communication antenna 13.

FIG. 2 illustrates the way vehicles equipped with the inter-vehicle communication device 11 travel. Specifically it depicts the way vehicle A, vehicle B, vehicle C, vehicle D and vehicle E are traveling on a triple-lane road. In this example, the vehicles are traveling from bottom to top of the drawing sheet and vehicle A, vehicle B, vehicle C and vehicle E are equipped with the inter-vehicle communication device 11, respectively. Vehicle D is not equipped with the inter-vehicle communication device 11. FIG. 2 shows the way pieces of the infrastructural information of vehicle A, vehicle B, and vehicle C are transmitted toward vehicle E on the above assumption.

Figures 3, 4:
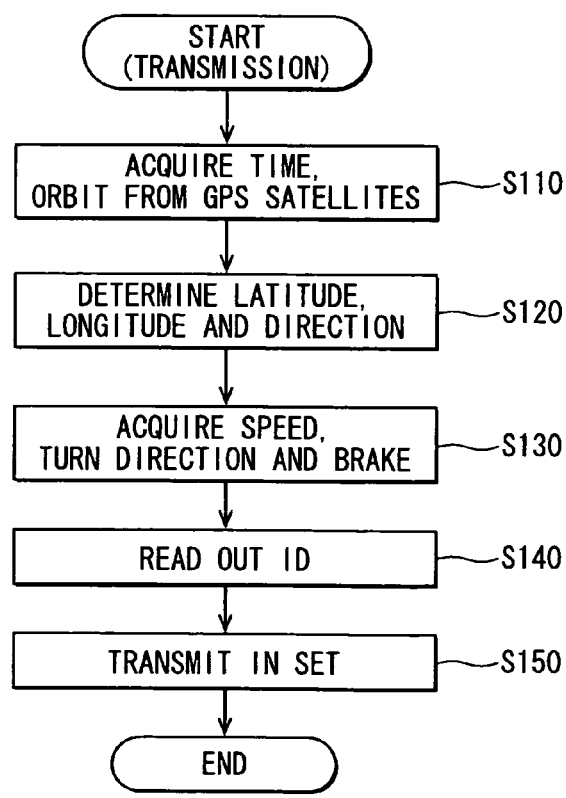
FIG. 3 is a table showing a detailed example of infrastructural information.
FIG. 4 is a flowchart illustrating processing of generating and transmitting infrastructural information.

Exemplary infrastructural information is shown in FIG. 3. The tables illustrated in FIG. 3 are detailed examples of infrastructural information. The infrastructure cited here is slightly different from the common meaning thereof. Here, the inter-vehicle communication devices 11 other than the inter-vehicle communication device 11 equipped in the subject vehicle are defined as infrastructure. Information transmitted from the other inter-vehicle communication devices is designated as infrastructural information. Infrastructural information about the subject vehicle collected for transmission to other vehicles may be used for the subject vehicle. This information is also designated as infrastructural information though not transmitted from other vehicles.

As illustrated in FIG. 3, infrastructural information includes identification (ID) information specific to each vehicle, GPS information acquired through the GPS antenna 29, and travel information acquired through the vehicle LAN 25.

The ID information includes vehicle ID specific to each vehicle and the entire length × the entire width of the vehicle. These pieces of information are stored beforehand in the system control ECU 31 during designing.

The GPS information includes latitude and longitude, traveling direction, and time. These pieces of information are derived by the system control ECU 31 based on information acquired from GPS satellites. Incidentally, 0 degree of traveling direction indicates true north and one turn is equivalent to 360 degrees. The value of traveling direction is increased as it turns clockwise.

The traveling information includes information on speed, turn signal flasher, and brake. Information on speed is obtained by ECU 31 which includes means for acquiring the speed of the vehicle that indicates the speed of the vehicle and is represented by scalar values. "Speed" cited in the following description is represented by a vector. information on turn signal flasher takes four pattern values, OFF, right, left and hazard. "OFF" represents that no turn signal flasher is in operation; "right (left)" represents that the right (left) turn signal flasher is in operation; and "hazard" represents that both turn signal flashers are in operation. Brake information indicates whether or not the foot brake or the parking brake is in operation.

The system control ECU 31 is configured and programmed to repeatedly carry out the processing of generating and transmitting infrastructural information as shown in FIG. 4. The infrastructural information of the subject vehicle is generated and transmitted to the surrounding area by carrying out this processing.

First, time information and orbit information sent out from GPS satellites are acquired through the GPS antenna 29 (S110). Latitude and longitude and traveling direction as the present position of the subject vehicle are determined based on the acquired orbit information (S120). Information on the speed of the subject vehicle, turn signal flasher information, and brake information are acquired through the LAN 25 (S130). ID information stored beforehand in the system control ECU 31 itself is read out (S140). Finally, the pieces of information acquired as above are grouped into one set to generate infrastructural information and the communication control ECU 15 is caused to transmit this information in a set to the surrounding area through the communication antenna 13 (S150).

The thus transmitted infrastructural information is received through the respective communication antenna 13 and stored by the system control ECU 31 of the inter-vehicle communication device 11 equipped in each of surrounding vehicles. All the infrastructural information acquired from other vehicles need not be stored. With respect to information sent from one and the same vehicle, for example, the latest one is sufficient. Even when some information is latest with respect to a vehicle, it is unnecessary if a sufficient time has passed and the information is old.

Figure 5:
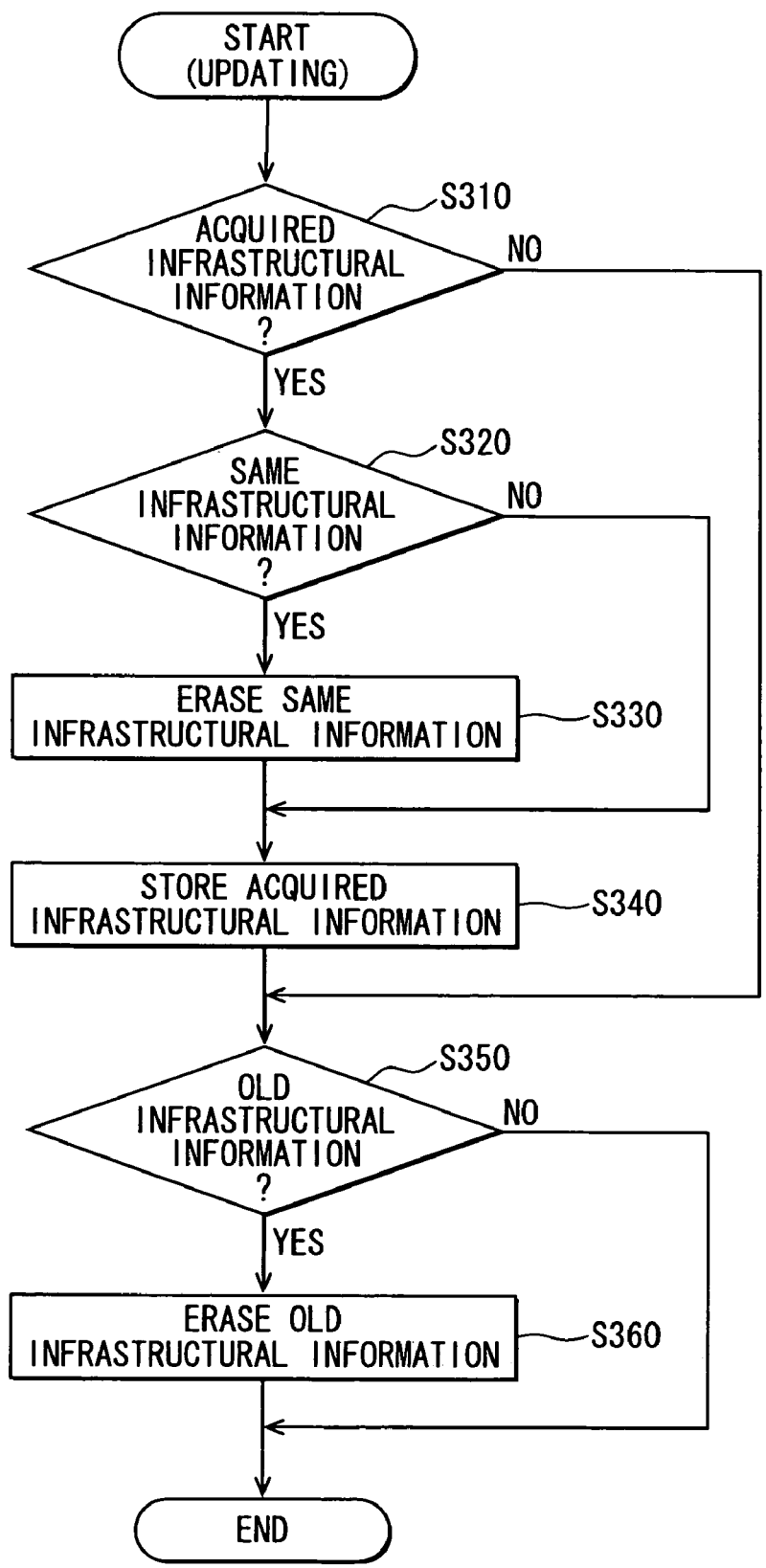
FIG. 5 is a flowchart illustrating processing of receiving and updating infrastructural information.

The system control ECU 31 is configured and programmed to discard such unnecessary information as shown in FIG. 5, which illustrates the processing of receiving and updating infrastructural information. This processing is repeatedly carried out almost exclusively by the system control ECU 31.

First, it is checked whether or not infrastructural information has been acquired through the communication antenna 13 (S310). When it is determined that infrastructural information has not been acquired through the communication antenna 13 (No at S310), step S350 is carried out.

Meanwhile, when it is determined that infrastructural information has been acquired through the communication antenna 13 (Yes at S310), it is checked whether or not infrastructural information including the same vehicle ID as the vehicle ID included in the acquired infrastructural information has been already stored in the relevant system control ECU itself (S320). When it is determined that infrastructural information including the same vehicle ID as the vehicle ID included in the acquired infrastructural information has been already stored (Yes at S320), the infrastructural information including the same vehicle ID as the vehicle ID included in the newly acquired infrastructural information is erased (S330). Meanwhile, when it is determined that infrastructural information including the same vehicle ID as the vehicle ID included in the acquired infrastructural information has not been stored (No at S320), nothing is done since there is not any object to be erased.

At the next step, the newly acquired infrastructural information is stored (S340). Then it is checked whether or not the time included in the infrastructural information is a predetermined or longer time before the present time (S350), that is, the infrastructural information is old. When it is determined that the time included in the infrastructural information is the predetermined or longer time before the present time (Yes at S350), the infrastructural information including the time the predetermined or longer time before the present time is erased (S360) and the processing of receiving and updating infrastructural information is terminated.

Meanwhile, when it is determined that the time included in the infrastructural information is not the predetermined or longer time before the present time (No at S350), nothing is done since there is not an object to be erased. The processing of receiving and updating infrastructural information is terminated. The infrastructural information illustrated in FIG. 3 is thus updated from time to time in the memory provided in the system control ECU 31 by repeating the above processing of receiving and updating infrastructural information.

Referring back to FIG. 2, the system control ECU 31 incorporated in the inter-vehicle communication device 11 equipped in each vehicle acquires forward vehicle information using the radar 21 and the radar control ECU 23 provided for the inter-vehicle communication device 11 incorporating the system control ECU itself. In FIG. 2, the range (coverage of capture of a forward vehicle) of the radar 21 equipped in vehicle E is shown as an example. Vehicle A, vehicle B and vehicle D are positioned in this coverage. Information on radar reflected by vehicle A, vehicle B and vehicle D is acquired by the system control ECU 31 equipped in vehicle E through the radar 21 and the radar control ECU 23.

The system control ECU 31 includes means for recognizing as a nearby object an object presumed to be equipped with a communication device that calculates forward vehicle information by its own x-y-coordinate system. This coordinate system is defined as follows: the center of the subject vehicle is taken as the center of coordinates; the direction of entire width is taken as the x-direction; the direction of entire length is taken as the y-direction; and the positive orientation in the y-direction is equivalent to the orientation of the front face of the vehicle.

Figure 6:
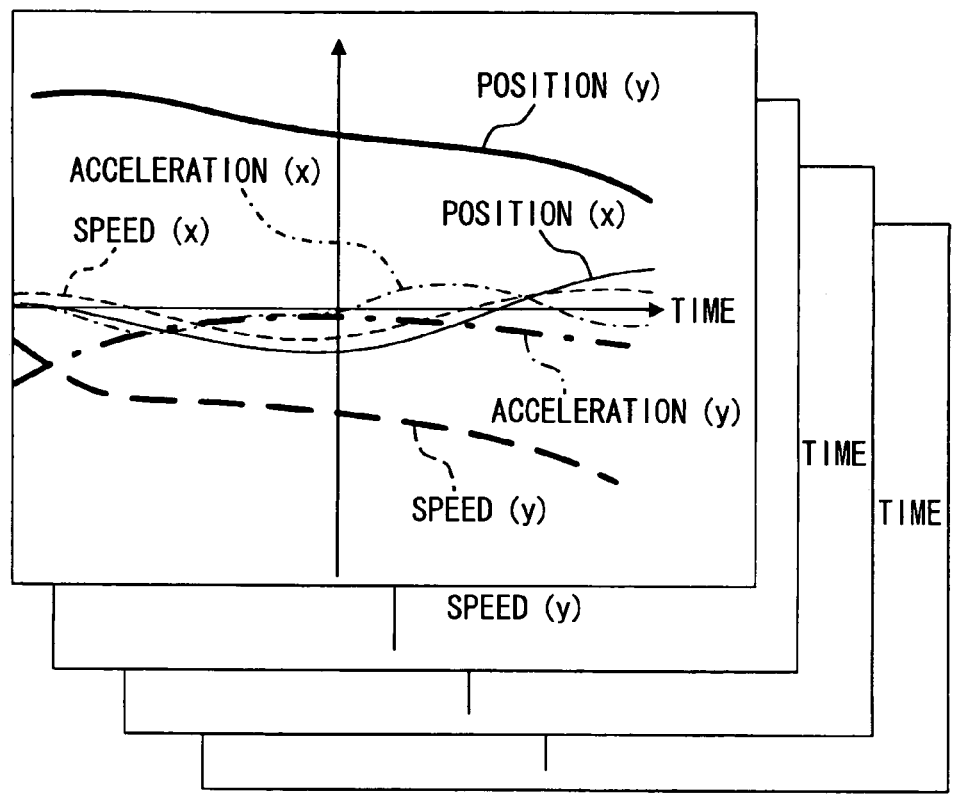
FIG. 6 is a graph representing forward vehicle information.

FIG. 6 represents the forward vehicle information of each vehicle in the form of graph. The contents of forward vehicle information include: the x-coordinate and the y-coordinate of the center of the forward vehicle; the speed (in the x-direction) and the speed (in the y-direction) of the forward vehicle relative to the subject vehicle; and the acceleration (in the x-direction) and the acceleration (in the y-direction) of the forward vehicle relative to the subject vehicle. The values of these pieces of information are calculated as functions of time. That is, forward vehicle information is estimation of the position, speed and acceleration of each forward vehicle from past to future with the present at the center.

Forward vehicle information for the period of past time will be referred to as past value; forward vehicle information for the present time will be referred to as present value; and forward vehicle information for the period of future time will be referred to as future value. The system control ECU 31 discards the information of a vehicle that could not be acquired by the radar for a certain period of time.

Figure 7:
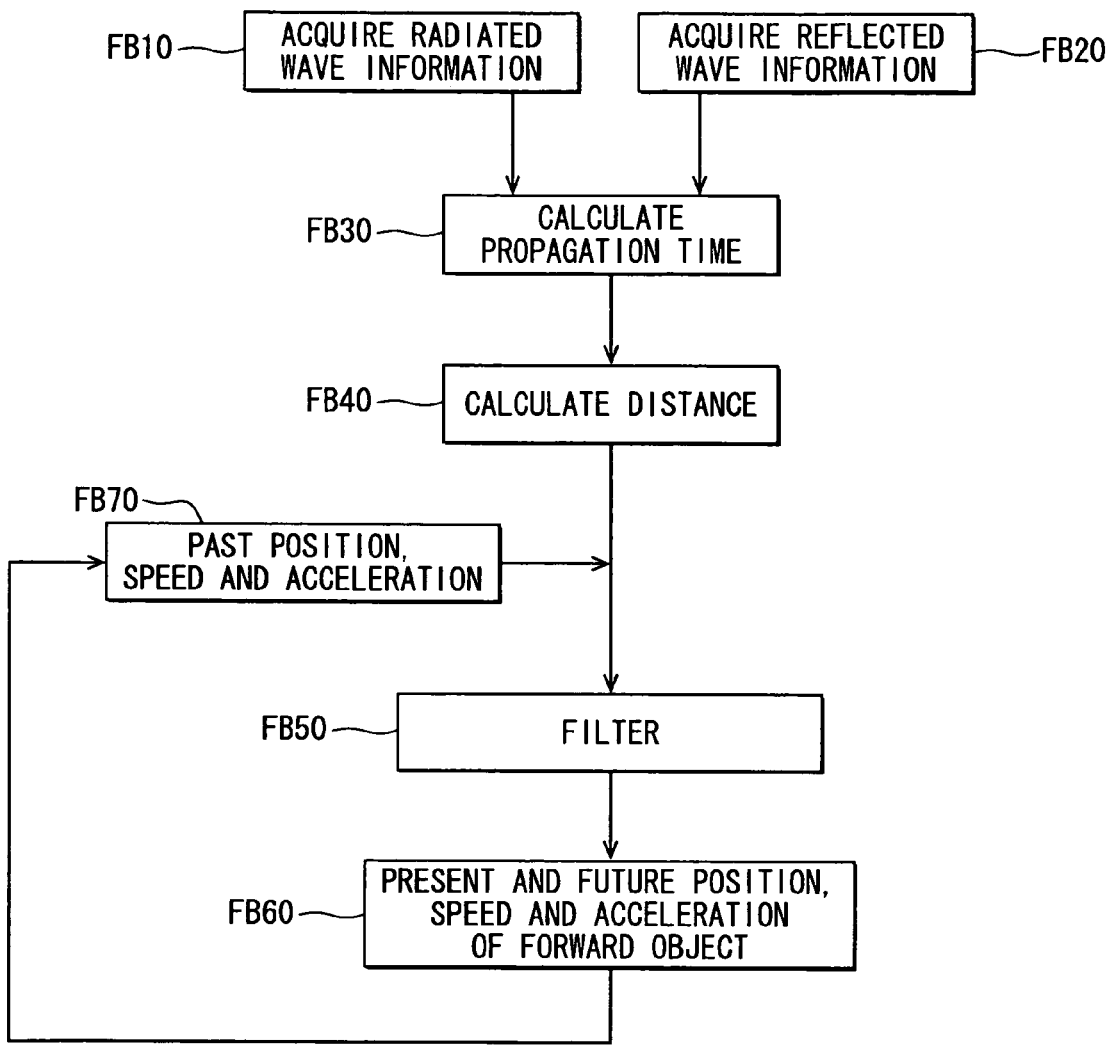
FIG. 7 is a functional block diagram illustrating acquisition of forward vehicle information.

The forward vehicle information is acquired as shown in FIG. 7. This acquisition method is well known and will be only briefly described with reference to FIG. 7, which represents the relation between the individual functions carried out by the system control ECU 31 when forward vehicle information is acquired. The system control ECU 31 carries out computation corresponding to each function in accordance with the relation illustrated in this functional block diagram and thereby acquires the forward vehicle information of each vehicle.

First, information on the phases of radiated waves radiated at predetermined angular intervals and information on the phase of the reflected wave corresponding to each radiated wave are acquired from the radar control ECU 15 (FB10 and FB20). With respect to each angle at which a radiated wave is radiated, the phase difference is acquired from information on two phases and the time of propagation of the radar wave is determined (FB30). The distance to an object that reflected the radiated wave is calculated from this time of propagation (FB40). However, with respect to an angle at which the reflected wave is weak and it is guessed that there is no object in a predetermined distance, distance computation is not carried out.

The distance calculated with respect to each angle and information on the position, speed and acceleration acquired in the past are inputted to a predetermined filter (Kalman filter or the like) (FB50). The following are thereby calculated with respect to each object that reflected the radar wave: the present position, speed and acceleration, and the position, speed and acceleration at each predetermined point of time in the future with the present time taken as the base point.

The calculated position, speed and acceleration are combined with information on the position, speed and acceleration of the object at each predetermined point of time in the past with the present time taken as the base point. The above forward vehicle information is thereby calculated with respect to each object that reflected the radar wave (FB60). The acquired forward vehicle information is stored in correlation with the time when the information was calculated (FB70). The reason which the forward vehicle information is stored in correlation with the time when the information was calculated is as follows: since the infrastructural information also includes time information, time information will be required when the forward vehicle information and the infrastructural information are compared with each other or other like processing is carried out later.

The information stored here is handled as values acquired in the past inputted at FB50 when this functional block is carried out after the lapse of a predetermined time. For the details of this type of technologies, refer to JP 2002-99986 A or U.S. patent application Ser. No. 12/228,135 filed on Aug. 8, 2008.

Figure 8:
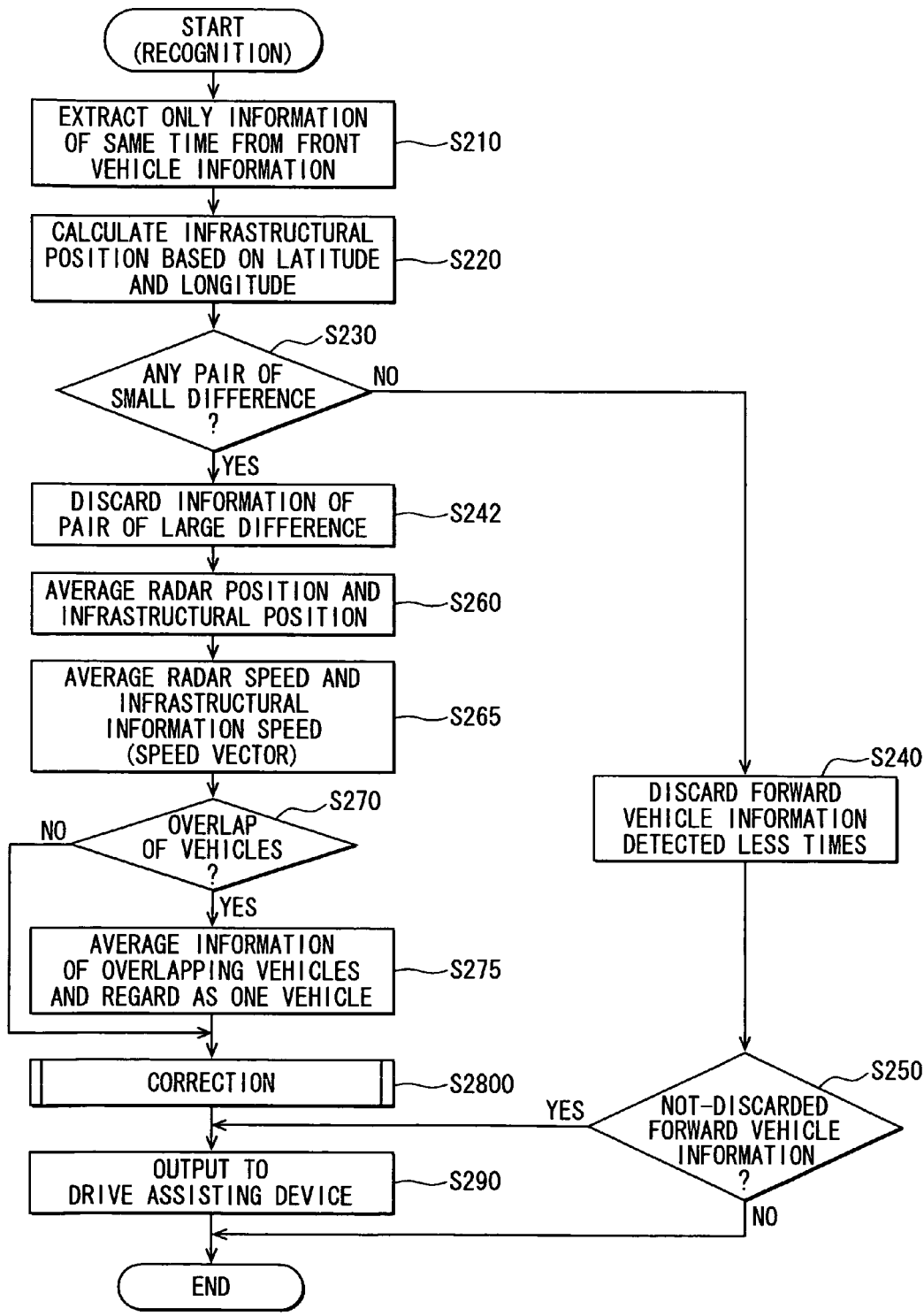
FIG. 8 is a flowchart illustrating recognition processing.

Recognition processing is shown in FIG. 8, which is carried out almost exclusively by the system control ECU 31 which includes means for correcting the position information. In this processing, the forward vehicle information is corrected with the infrastructural information. In addition, the corrected information is outputted to a drive assisting device (not shown).

The execution of this processing is triggered by the system control ECU 31 itself determining that one or more pieces of both forward vehicle information and infrastructural information are stored. It is assumed here as an example that the system control ECU 31 is equipped in vehicle E.

First, the individual pieces of forward vehicle information and the individual pieces of infrastructural information are combined in all the possible pairs. In each pair, only information at the same time as the time information in infrastructural information is extracted from forward vehicle information as a function of time and this extracted information is set as an object to be processed (S210). That is, information at some time is extracted from radar information as a function of time and only the extracted information is taken as the target of the following processing. Here, the time indicated by infrastructural information is taken as the present time. The position indicated by forward vehicle information at this time will be hereafter referred to as "radar position" and the speed indicated by forward vehicle information at this time will be hereafter referred to as "radar speed."

The processing of step S210 will be described in detail. From the viewpoint of vehicle E described with reference to FIG. 2, there are three vehicles A, B and C indicated by infrastructural information. Hereafter, infrastructural information corresponding to vehicle A will be designated as a; infrastructural information corresponding to vehicle B will be designated as b; and infrastructural information corresponding to vehicle C will be designated as c. It will be assumed that there are four vehicles indicated by forward vehicle information and these vehicles will be respectively designated as x, y, z and w.

It will be assumed that z and w have just come into the radar coverage and their numbers of times of radar acquisition are small. As described before as the background art, the information acquired in such a situation is inferior in reliability. According to the background art, therefore, the information cannot be outputted as the information of a vehicle.

With respect to the vehicles indicated by forward vehicle information, x and y correspond to vehicle A; z corresponds to vehicle B; and w corresponds to vehicle D. This information is intrinsically information that can be acquired only after infrastructural information and forward vehicle information are integrated with each other by subsequent processing. However, it is described first for making the description based on the detailed example clearly understandable.

Figure 9:
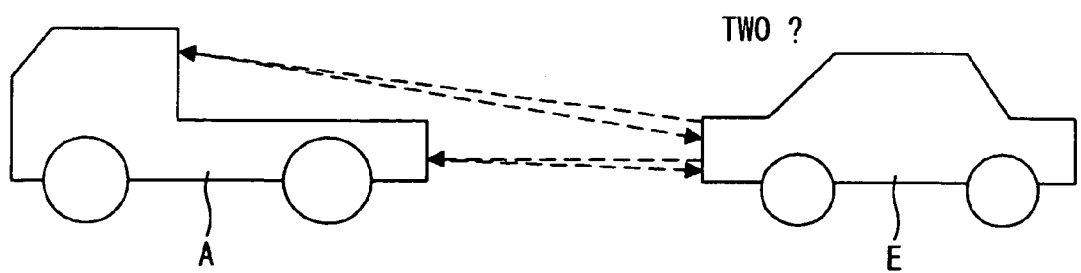
FIG. 9 is a schematic diagram illustrating cause of erroneous recognition by information from a radar.

There are two pieces of forward vehicle information corresponding to vehicle A. This will be described with reference to FIG. 9. FIG. 9 illustrates vehicle A and vehicle E. Radar waves radiated by the radar 21 equipped in vehicle E and reflected waves thereof are indicated by broken lines. When the body or chassis of vehicle A has a large step like a truck, vehicle A may be erroneously recognized as if there are two vehicles. X and y correspond to vehicle A for this reason.

Referring back to the processing of step S210, infrastructural information and forward vehicle information are grouped into 12 pairs, ax, ay, az, aw, bx, by, . . . In pair ax, for example, the information of x at the same time as the time indicated by a is used. This is the same with the other pairs.

In each pair, the position of the vehicle indicated by infrastructural information is represented by the same x-y coordinate system as that of the radar position (S220). This is done based on the information on latitude and longitude included in the infrastructural information of the subject vehicle and the other vehicles. The position information acquired here will be hereafter referred to as "infrastructural position."

The difference between the radar position and the infrastructural position is calculated and it is checked whether or not there is any pair with this small difference equal to or smaller than a predetermined threshold value (S230). The purpose of the processing of steps S220 and S230 is to identify which forward vehicle information and which infrastructural information pertain to one and the same vehicle.

When it is determined that there is no pair with the calculated difference in distance equal to or smaller than the predetermined threshold value (No at S230), steps S240 and S250 are carried out in the same manner as in the conventional system. Specifically, at step S240, the forward vehicle information, which is acquired by the radar in less than a predetermined threshold number of times, is discarded. Then it is checked at step S250 whether there is any forward vehicle information, which has not been discarded. If there remains not-discarded forward vehicle information (Yes at S250), the forward vehicle information is outputted to a predetermined drive assisting device (S290) thus ending the recognition processing. If there remains no not-discarded forward vehicle information (No at S250), no information remains to be outputted and hence the recognition processing is ended.

Meanwhile, when it is determined that there is a pair with the calculated difference in distance equal to or smaller than the predetermined threshold value (Yes at S230), the following processing is carried out: the pieces of information of the pairs other than the pair with the calculated difference in distance equal to or smaller than the predetermined threshold value are discarded (S242). In the example in FIG. 2, ax, ay, and bz are the relevant pairs. Thus the pieces of information of the other pairs are all discarded.

At this stage, the system control ECU 31 recognizes that x and y are information pertaining to vehicle A and z is information pertaining to vehicle B.

Subsequently, with respect to each pair that has not been discarded, the radar position and the infrastructural position of the pair are averaged (S260). In addition, with respect to each pair, ECU 31 includes means for correcting the speed of the nearby object where the speed in forward vehicle information and the speed in infrastructural information are averaged (S265). The speed in forward vehicle information is calculated by synthesizing the relative speed (in the x-direction) and the relative speed (in the y-direction) in radar speed.

With respect to speed in infrastructural information, it is required to transform the coordinates in the infrastructural information of the other vehicles beforehand. This is because for averaging, it is required to match the coordinate system of infrastructural information with the coordinate system of forward vehicle information. A detailed computation method is such that: the speed of the subject vehicle is subtracted from the speed of another vehicle corresponding to infrastructural information. At this time, the "speed" indicated by each piece of infrastructural information is taken as the magnitude of each speed and the "traveling direction" indicated by each piece of infrastructural information is taken as the direction of each speed.

In the processing of steps S260 and S265, weight may be added for averaging so that forward vehicle information is reflected better. This is because forward vehicle information is higher in reliability.

ECU 31 includes means for checking whether a plurality of nearby objects are a single object where it is checked whether or not there is any portion where vehicles overlap each other by a predetermined or more area when the vehicles are disposed in the positions calculated at step S260 (S270). Description will be given to the disposition referred to here. This disposition is two-dimensional and does not include conception in the vertical direction. That is, the disposition means that rectangles analogous to vehicles are placed on a drawing indicating the ground viewed from directly above.

A position acquired at step S260 is taken as the center position of the corresponding rectangle. The "entire length" in infrastructural information is taken as the length of the long sides of the rectangle and the "entire width" in infrastructural information is taken as the length of the short sides of the rectangle. In addition, the direction of the speed (travel) acquired at step S265 is taken as the direction of the long sides of the rectangle. In the processing of step S270, with respect to each pair, it is checked whether or not there are any rectangles that overlap each other by a predetermined or more area when rectangles compared to vehicles are disposed as described above.

When it is determined that there are vehicles that overlap each other by a predetermined or more area when vehicles are disposed in the positions calculated at step S260 (Yes at S270), the following processing is carried out: the vehicles are regarded as one vehicle and the positions acquired at step S260 are averaged with respect to each vehicle that overlaps by a predetermined or more area; with respect to each vehicle that overlaps by a predetermined or more area, the speeds acquired at step S265 are averaged; and the accelerations included in forward vehicle information pertaining to each vehicle that overlaps by a predetermined or more area are averaged. The position, speed and acceleration of the one vehicle are thereby determined (S275).

The purpose of the processing of step S275 is to correct erroneous recognition. When recognition is carried out only from information acquired from the radar 21, vehicle A shown in FIG. 9, for example, is erroneously recognized as two vehicles. In such a case, the information can be corrected by utilizing infrastructural information. However, there is some caution to be exercised at this time. Specifically, only pairs having identical infrastructural information should be regarded as one vehicle. For example, a combination of ax and ay poses no problem. However, a combination of ax and bz and a combination of ay and bz must be avoided even though the distances are close to each other. This is because when infrastructural information differs, the vehicle also differs.

The processing up to this point is carried out on the present values. Subsequently, correction processing is carried out (S2800). This correction processing is carried out to correct the future values of position and speed acquired by the above-described processing by a filter (FB50). As described with reference to FIG. 6 and FIG. 7, future values can be calculated by a conventional technology based on past values and present values. More advantageous effect than with conventional technologies can be acquired just by computing future values based on the present values corrected by the processing up to this point. In this embodiment, these future values are further corrected with traveling information included in infrastructural information by means for estimating a future position of the nearby object in ECU 31.

This will be described with reference to FIG. 10. First, with respect to each forward object, values acquired at step S2870 at the previous time or before are taken as input values in place of the values at FB70. Further, the present position acquired by the processing of step S260 this time is taken as the distance to the forward vehicle acquired from the time of propagation of the radar wave. These values are anew inputted to the filter described with reference to the functional block diagram in FIG. 7 and the present position, present speed and future speed are thereby estimated (S2805). That is, the target of this correction processing is pairs addressed at steps S260 to S275 and values acquired just by inputting the above-described information acquired from the radar to the filter are not addressed.

At step S2805, the pieces of information on acceleration at the present time and in the future are also acquired. However, since information on acceleration is not used in the subsequent correction processing, acceleration is not referred to in this description.

The estimated present position, present speed and future speed are transformed to position and speed on the basis of latitude lines and longitude lines (S2807). Specifically, the estimated values are transformed by the infrastructural information of the subject vehicle. That is, the following processing is carried out by using the information on latitude and longitude as the position of the subject vehicle: the position in forward vehicle information acquired on the basis of the subject vehicle is transformed to a position on the basis of latitude and longitude. This is the same with speed.

It is checked whether or not the brake information in infrastructural information indicates ON (S2820). When it is determined that the brake information in infrastructural information indicates ON (Yes at S2820), the following processing is carried out: the magnitude of the vector of the future speed acquired up to this point is multiplied by a constant (for example, 0.8) less than 1 (S2825) and step S2830 is carried out. Meanwhile, when it is determined that the brake information in infrastructural information indicates OFF (No at S2820), step S2830 is carried out.

At step S2830, it is checked whether or not the turn signal flasher information in infrastructural information indicates left turn. When it is determined that the turn signal flasher information in infrastructural information indicates left turn (Yes at S2830), the following processing is carried out: the direction of the vector of the future speed acquired up to this point is rotated to left (counterclockwise) through a predetermined angle (S2835) and step S2860 is carried out. Meanwhile, when it is determined that the turn signal flasher information in infrastructural information does not indicate left (No at S2830), step S2840 is carried out.

At step S2840, it is checked whether or not the turn signal flasher information in infrastructural information indicates right turn. When it is determined that the turn signal flasher information in infrastructural information indicates right (Yes at S2840), the following processing is carried out: the direction of the vector of the future speed acquired up to this point is rotated to right (clockwise) through a predetermined angle (S2845) and step S2860 is carried out. Meanwhile, when it is determined that the turn signal flasher information in infrastructural information does not indicate right (No at S2840), step S2850 is carried out.

At step S2850, it is checked whether or not the turn signal flasher information in infrastructural information indicates hazard. When it is determined that the turn signal flasher information in infrastructural information indicates hazard (Yes at S2850), the following processing is carried out: the magnitude of the vector of the future speed acquired up to this point is multiplied by a constant (for example, 0.8) less than 1 (S2855) and S2860 is carried out. Meanwhile, when it is determined that the turn signal flasher information in infrastructural information does not indicate hazard (No at S2850), step S2860 is carried out.

At step S2860, a future position is determined based on the present values of speed acquired by the correction processing up to this point and the position acquired by the processing of step S2807. This method for determining the future position will be described with reference to FIG. 11.

Figure 11:
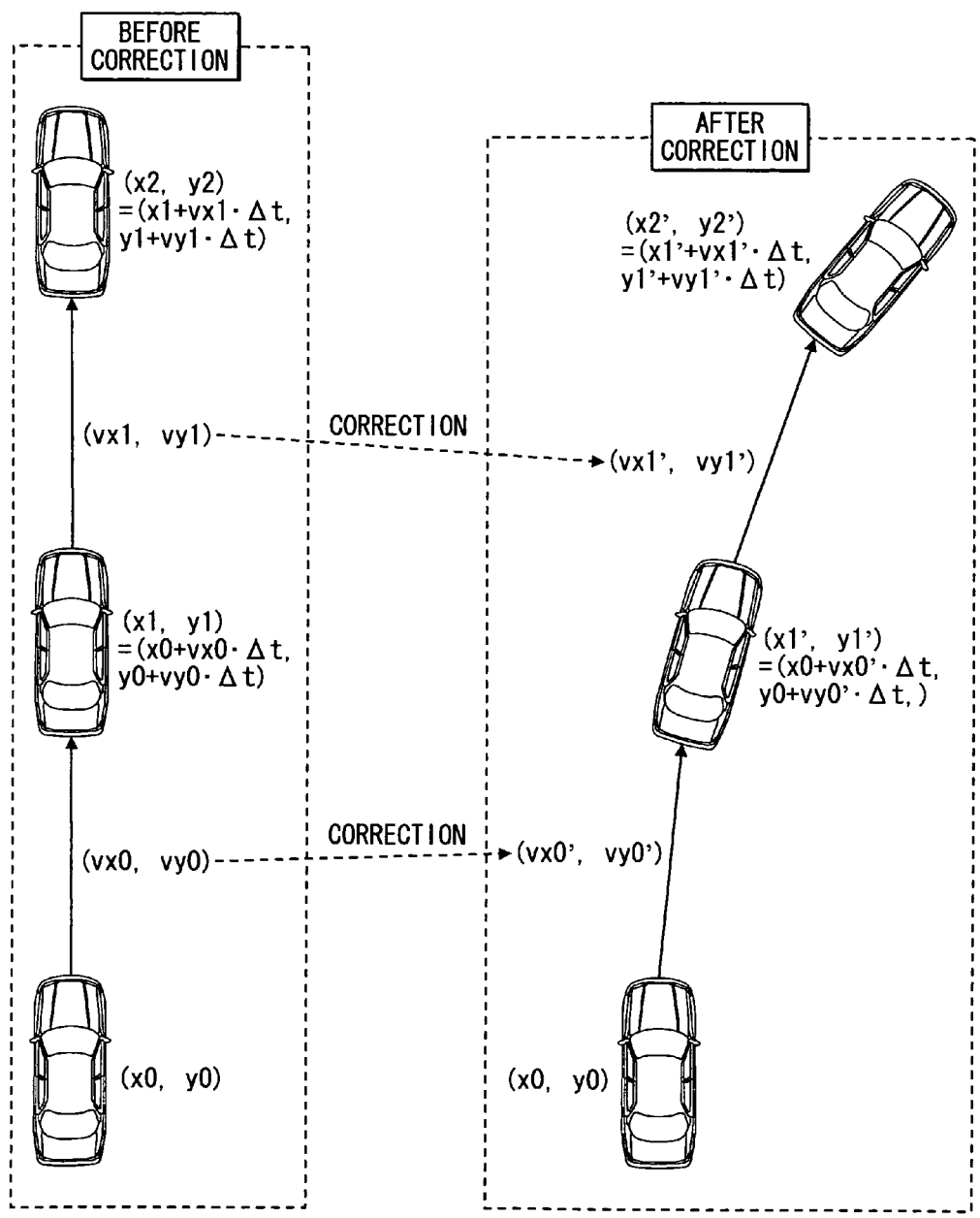
FIG. 11 is a schematic diagram illustrating correction of a future position.

FIG. 11 illustrates determination of the future position by the future speed. Left-side illustration (a) shows how the future position is calculated based on the future speed acquired at step S2807. First, (x0, y0) is taken as the present position and (vx0, vy0) is taken as the present speed. Thus the position (x1, y1) a very short time $\Delta t$ later is expressed as (x0+vx0·Δt, y0+vy0·Δt). Letting the speed a very short time Δt after the present time be (vx1, vy1), the position another short time Δt later is expressed as (x1+vx1·Δt, y1+vy1·Δt).

Meanwhile, right-side illustration (b) shows the result acquired at step S2860. It will be assumed that the future speed acquired at step S2807 is corrected at steps S2820 to S2855. Specifically, it will be assumed that (vx0, vy0) is corrected to (vx0', vy0') and (vx1, vy1) is corrected to (vx1', vy1'). Thus the position (x1', y1') a very short time Δt after the present time is expressed as (x0+vx0'·Δt, y0+vy0'·Δt). Letting the speed a very short time Δt after the present time be (vx1', vy1'), the position another very short time Δt later is expressed as (x1'+vx1'·Δt, y1'+vy1'·Δt).

Following step S2860, the future position and future speed acquired by the processing up to this point are transformed to those of the coordinate system on the basis of the subject vehicle (S2870). That is, the processing inverse to the processing of step S2807 is carried out. Specifically, the position of another vehicle on the basis of the subject vehicle is determined from the positions of the subject vehicle and the other vehicle acquired on the basis of latitude and longitude. This is the same with speed. Then the correction processing is terminated.

As described above, the values calculated at step S2870 are used at step S2805 in the subsequent and following correction processing. That is, the values acquired as present value and future value are turned into past values with time; therefore, they are handled as past values at step S2805. In addition, with respect to information on acceleration, the values calculated at step S2805 are handled as past values at step S2805 in the subsequent and following processing.

Figure 10:
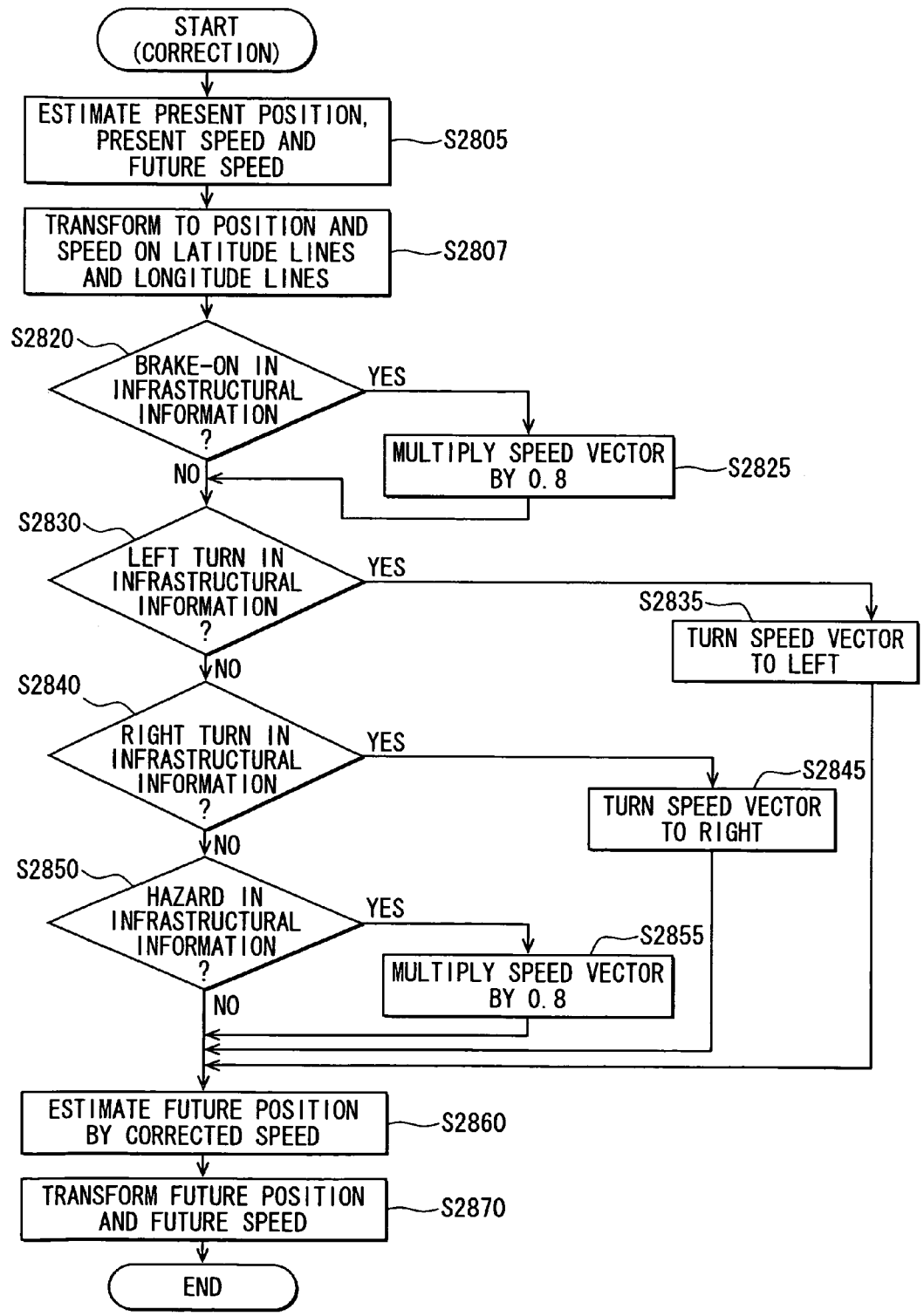
FIG. 10 is a flowchart illustrating correction processing.

After the correction processing (S2800) shown in FIG. 10 is carried out, step S290 is carried out to output to the drive assisting device the present and future positions of the forward vehicle information (present and future positions of the forward vehicle) of the vehicle, which was acquired by the radar but determined No at step S230.

In the example of FIG. 2, such information is not present because w that corresponds to vehicle D is not more than the threshold value in respect of the number of acquisition by the radar.

This recognition processing is summarized as follows. At steps S210 to S275, the present value of the forward vehicle information is corrected with the specific information of the infrastructural information, GPS information and the speed information, which is a part of the travel information. At step S2800, the future value of the forward vehicle information is corrected. By this correction processing, the forward vehicle information becomes more accurate.

This advantage is described in more detail, assuming that the vehicles will happen to encounter and collide. According to the conventional system, no information is outputted until the number of acquisition by the radar reaches the threshold value, and hence the drive assisting device will not possibly be able to take appropriate action to avoid a collision in time. According to the embodiment, however, the subject vehicle acquires a vehicle that will likely collide with the subject vehicle by the infrastructural information in advance. As a result, even if the number of acquisition is less than the threshold value, useful information can be outputted to the drive assisting device shortly after acquiring information from the radar. Thus, the probability of avoiding possible collision can be increased.

It is also assumed that the forward vehicle changes its travel lane from the different one to the same one, on which the subject vehicle is traveling. In this case, if the future value is estimated as in the conventional system, the danger will be recognized after a certain time from actually starting to turn. According to the embodiment, the future value is estimated based on the turn signal flasher information in advance of actually starting to turn. Therefore, the possible danger is already recognized when the subject vehicle actually starts to turn. Thus it is highly possible to avoid the danger by the drive assisting device.

Even in the case that the subject vehicle is likely to bump the forward vehicle from behind, the danger will be avoided by using the brake information or the hazard information.

As understood from the foregoing description, the processing of FB10 to FB70 operates as analyzing means; steps S210 to S242 operate as recognizing means; step S260 operates as position correcting means; step S265 operates as speed correcting means; step S270 operates as identical object check means.

The present invention is not limited to the disclosed embodiment but may be implemented in many other ways.

For example, the embodiment may be applied to a motor cycle. In the recognition processing, the information of pair, which has the same infrastructural information but was not determined to be identical, may be discarded. This is because it is likely that erroneous determination was made in the processing of pairing the infrastructural information and the radar information.

What is claimed is:
1. A recognition system comprising:
a recognition device provided in a subject vehicle and including a radar ECU configured to determine a position of an object by radiating a radar wave and receiving a reflected wave reflected by the object; and
a transmission device provided in the subject vehicle, the transmission device configured to wirelessly transmit present position information of the subject vehicle into a surrounding area,
wherein the recognition device includes a system ECU configured to:
receive position information;
acquire the present position information of the recognition device;
recognize as a nearby object an object presumed to be equipped with a communication device among objects whose positions have been determined by the radar ECU based on a result of analysis by the radar ECU, the position information received by the system ECU, and a result of acquisition by the system ECU; and
correct the position information of the nearby object based on the result of acquisition by the system ECU and the position information of the nearby object received by the system ECU; wherein
the recognition device is configured to check whether a plurality of nearby objects recognized by the system ECU are a single object;
the transmission device is provided in each of a plurality of vehicles and configured to transmit ID information and size information, the ID information being specific to each vehicle and the size information being indicative of a size of each vehicle;
the system ECU is configured to receive the ID information and the size information of vehicles other than the subject vehicle; and
the system ECU is configured to perform a check operation on nearby objects of vehicles, which are indentified by the ID information received by the system ECU, based on the corrected position of each nearby object corrected by the system ECU and the size information of each nearby object received by the system ECU.

2. The recognition system of claim 1, wherein:
the transmission device is configured to transmit wirelessly speed information of the subject vehicle into the surrounding area;
the system ECU is configured to receive speed information of the object;
the radar ECU is configured to determine the position and the speed of the object based on the result of receiving the reflected wave; and
the system ECU is configured to acquire speed of the subject vehicle, and is configured to correct the speed of the nearby object based on the speed information of the subject vehicle and the speed information of the nearby object.

3. The recognition system of claim 2, wherein:
the transmission device is configured to transmit wirelessly into the surrounding area operation information indicating that an operation device of the subject vehicle is operated in connection with travel of the subject vehicle;
the system ECU is configured to receive operation information of other vehicles; and
the system ECU is configured to estimate a future position of the nearby object based on the corrected position information corrected by the system ECU and the operation information received by the system ECU.

4. The recognition system of claim 3, wherein:
the operation device includes at least one of a turn indicating flasher, a brake and a hazard lamp.

5. The recognition system of claim 1, wherein;
the system ECU is configured to check whether the nearby objects overlap each other by more than a predetermined area in respect of sizes of the nearby objects, and is configured to determine that the nearby objects form the single object when an area of overlap of the nearby objects is more than the predetermined area.

6. A recognition system comprising:
a recognition device provided in a subject vehicle and including a radar ECU configured to determine a position of an object by radiating a radar wave and receiving a reflected wave reflected by the object; and
a transmission device provided in the subject vehicle, the transmission device configured to wirelessly transmit present position information of the subject vehicle into a surrounding area,
wherein the recognition device includes a system ECU configured to:
receive position information;
acquire the present position information of the recognition device:
recognize as a nearby object an object presumed to be equipped with a communication device among objects whose positions have been determined by the radar ECU based on a result of analysis by the radar ECU, the position information received by the system ECU, and a result of acquisition by the system ECU; and
correct the position information of the nearby object based on the result of acquisition by the system ECU and the position information of the nearby object received by the system ECU; wherein
the system ECU is configured to check whether a plurality of nearby objects recognized by the system ECU are a single object;
the transmission device is provided in each of the plurality of vehicles and configured to transmit size information, the size information being indicative of a size of each vehicle;
the system ECU is configured to receive the size information of vehicles other than the subject vehicle; and
the system ECU is configured to perform a check operation on nearby objects of vehicles, which are identified based on the position of each nearby object corrected by the system ECU and the size information of each nearby object received by the system ECU.

7. The recognition system of claim 6, wherein:
the system ECU is configured to check whether the nearby objects recognized by the system ECU overlap each other by more than a predetermined area in respect of sizes of the nearby objects, and is configured to determine that the nearby objects form the single object when an area of overlap of the nearby objects is more than the predetermined area.

* * * * *